(12) United States Patent
Aikawa et al.

(10) Patent No.: US 7,120,670 B2
(45) Date of Patent: Oct. 10, 2006

(54) DATA COMMUNICATION DEVICE, DATA COMMUNICATION METHOD AND DATA COMMUNICATION PROGRAM THAT CAN SEND REPLY TO BLIND CARBON COPY RECIPIENTS AND COMPUTER-READABLE RECORDING MEDIUM STORING SAID PROGRAM

(75) Inventors: Masafumi Aikawa, Machida (JP); Tsumoru Matsuura, Matsudo (JP)

(73) Assignee: Minolta Co., Ltd., Osaka (JP)

( * ) Notice: Subject to any disclaimer, the term of this patent is extended or adjusted under 35 U.S.C. 154(b) by 728 days.

(21) Appl. No.: 10/189,583

(22) Filed: Jul. 8, 2002

(65) Prior Publication Data

US 2003/0023696 A1 Jan. 30, 2003

(30) Foreign Application Priority Data

Jul. 16, 2001 (JP) .............................. 2001-215770

(51) Int. Cl.
*G06F 13/00* (2006.01)
(52) U.S. Cl. ...................................... 709/206; 709/207
(58) Field of Classification Search ................ 709/203, 709/206, 207, 217–219, 227
See application file for complete search history.

(56) References Cited

U.S. PATENT DOCUMENTS 5,632,018 A * 5/1997 Otorii .......................... 709/200
6,226,670 B1 * 5/2001 Ueno et al. .................. 709/207
6,327,612 B1 * 12/2001 Watanabe .................... 709/206
6,356,356 B1 * 3/2002 Miller et al. ................ 358/1.15
6,480,884 B1 * 11/2002 Saito .......................... 709/207
6,625,642 B1 * 9/2003 Naylor et al. ............... 709/206
6,671,061 B1 * 12/2003 Joffe et al. .................. 358/1.15
6,825,955 B1 * 11/2004 Shibata ....................... 358/402
6,851,049 B1 * 2/2005 Price, III ..................... 713/150
6,917,806 B1 * 7/2005 Chng et al. ............... 455/435.1

FOREIGN PATENT DOCUMENTS

JP 2000-330882 11/2000

* cited by examiner

*Primary Examiner*—Khanh Dinh
*Assistant Examiner*—Van Kim T. Nguyen
(74) *Attorney, Agent, or Firm*—Buchanan Ingersoll & Rooney PC (57) ABSTRACT

A data communication device, etc. that enable a reply e-mail to an e-mail sent via broadcast transmission to be sent to an e-mail address designated as 'BCC' for the broadcast transmission while maintaining the confidentiality of the e-mail address designated as 'BCC', by storing in a storage device multiple e-mail addresses to which an e-mail was sent via broadcast transmission, receiving a reply e-mail to the e-mail sent via broadcast transmission from one of the multiple e-mail addresses, and sending copies of the received reply e-mail to an e-mail address designated as 'BCC' based on the e-mail addresses stored in the storage device when the e-mail address designated as 'BCC' is included in the multiple e-mail addresses to which the e-mail had been sent via broadcast transmission.

10 Claims, 12 Drawing Sheets

| SUBJECT | E-MAIL ADDRESSES ||| SENDER | DATE AND TIME | E-MAIL SIZE | LEVEL OF IMPORTANCE | ATTACHED FILE |
| --- | --- | --- | --- | --- | --- | --- | --- | --- |
| | TO | CC | BCC | | | | | |
| RE: MEETING | #1@a.b.com #4@a.b.com | #2@a.b.com | #3@a.b.com | #0@c.b.com | 2001.01.15 18:31 | 7 KByte | HIGH | Image.bmp |

DATA COMMUNICATION DEVICE, DATA COMMUNICATION METHOD AND DATA COMMUNICATION PROGRAM THAT CAN SEND REPLY TO BLIND CARBON COPY RECIPIENTS AND COMPUTER-READABLE RECORDING MEDIUM STORING SAID PROGRAM

This application is based on Japanese Patent Application No. 2001-215770 filed in Japan on Jul. 16, 2001, the entire content of which is hereby incorporated by reference.

BACKGROUND OF THE INVENTION

1. Field of the Invention

The present invention pertains to a data communication device, a data communication method, a data communication program and a computer-readable recording medium storing the above program (hereinafter collectively referred to as the 'data communication device, etc.'), and more particularly, to a data communication device, etc. that can send reply to recipients designated as 'BCC'.

2. Description of the Related Art

A broadcast transmission service in which copies of one e-mail are sent to multiple e-mail addresses is known, and the recipient can send a reply e-mail to such broadcast-transmitted e-mail. In addition, Japanese Laid-Open Patent Application 2000-330882 discloses a technology for handling e-mails and reply e-mails that comprises an apparatus that can manage sent e-mails and reply e-mails thereto while mutually associating them.

However, an e-mail address that is designated as 'BCC' (blind carbon copy) can be included in the multiple e-mail addresses to which an e-mail is sent via broadcast transmission. Where an e-mail address is designated as 'BCC', an e-mail having the same contents as the e-mail sent to the main recipient ('To') is sent to the e-mail address designated as 'BCC' without its existence being known to the other e-mail addresses, i.e., the other recipients of the broadcast-transmitted e-mail. Where an e-mail is sent via broadcast transmission to multiple e-mail addresses that include an e-mail address designated as 'BCC', the existence of the e-mail address designated as 'BCC' is not made known to the other e-mail addresses to which the broadcast-transmitted e-mail was sent. Therefore, where a reply e-mail to the broadcast-transmitted e-mail is sent from one of the multiple e-mail addresses (broadcast transmission recipients), it cannot be sent to the e-mail address designated as 'BCC' for the broadcast transmission.

Furthermore, multi-function peripheral apparatuses that have come into practical use in recent years can send, as an image file attached to an e-mail, image data that is obtained by reading an original document using a scanner. Therefore, when an e-mail is sent to multiple e-mail addresses via broadcast transmission by this multi-function peripheral apparatus, a reply e-mail cannot be returned to the e-mail address that was designated as 'BCC' for the broadcast transmission, as in the case described above.

OBJECT AND SUMMARY

An object of the present invention is to provide an improved data communication device, etc. that resolve the various problems described above.

Another object of the present invention is to provide a data communication device, etc. that enable a reply e-mail to an e-mail sent via broadcast transmission to be sent to an e-mail address designated as 'BCC' for the broadcast transmission while maintaining the confidentiality of the e-mail address designated as 'BCC'.

Still another object of the present invention is to provide a data communication device, etc. that enable a reply e-mail to an e-mail that includes data obtained through reading of an original document to be sent to an e-mail address designated as a 'BCC' recipient for the broadcast transmission.

The above various objects can be attained by providing a data communication device comprising recipient accepting means that accepts designation of one or more e-mail addresses as recipients for an e-mail for each transmission configuration, which includes 'To', 'CC' and/or 'BCC'; sending means that sends the e-mail via broadcast transmission to multiple e-mail addresses the designation of which was accepted by the recipients accepting means; storing means that stores in a storage device the multiple e-mail addresses to which the e-mail was sent by the sending means via broadcast transmission; receiving means that receives a reply e-mail to the e-mail sent via broadcast transmission from one of the multiple e-mail addresses to which the e-mail was sent via broadcast transmission by the sending means; and, reply e-mail sending means that, where an e-mail address designated as 'BCC' is included in the multiple e-mail addresses to which the e-mail had been sent via broadcast transmission by the sending means, sends a copy of the reply e-mail received by the receiving means to the e-mail address designated as 'BCC' based on the e-mail addresses stored in the storage device.

It is acceptable if the data communication device further includes a reader that reads an original document and obtains data regarding such document, and the sending means sends via broadcast transmission the data obtained by the reader together with the e-mail.

It is also acceptable if the data communication device further includes determining means that determines whether or not the reply e-mail received by the receiving means includes permission information that indicates that transmission of a copy of the reply e-mail to an e-mail address designated as 'BCC' is permitted, and the reply e-mail sending means sends the copy of the reply e-mail to the e-mail address designated as 'BCC' only when it is determined by the determining means that such permission information is included in the reply e-mail.

These various objects are also attained by a data communication method and data communication program by which to execute the same processes as that executed by the data communication device described above, as well as by a computer-readable recording medium that stores such data communication program.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Embodiments of the present invention are explained in detail below with reference to the drawings.

Figure 1:
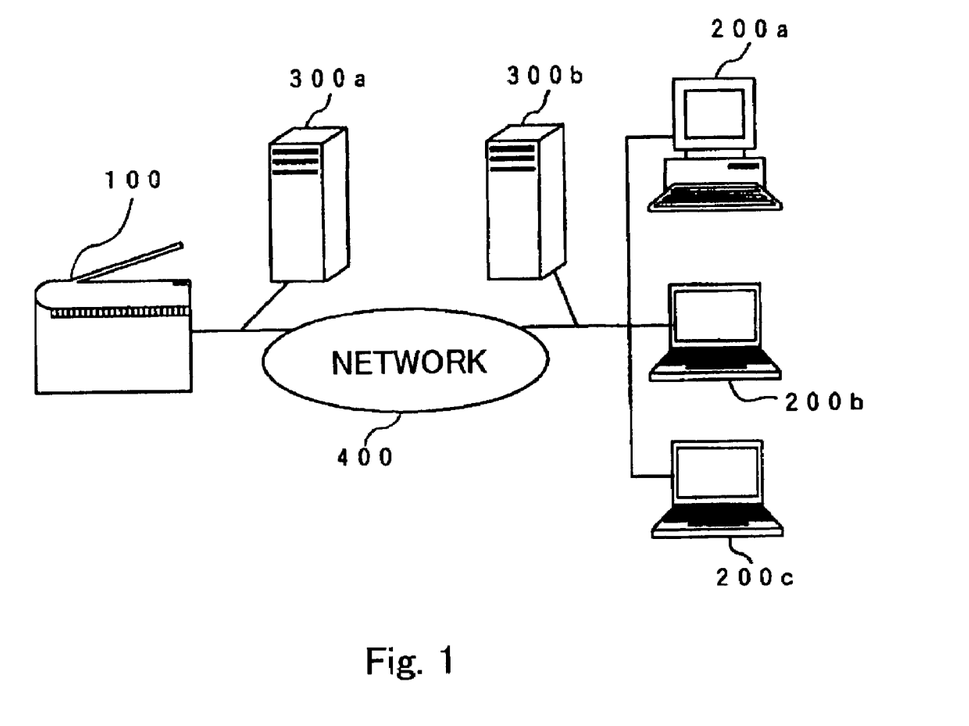
FIG. 1 is a drawing showing an example of the construction of a data communication system of an embodiment of the present invention.

FIG. 1 is a block diagram showing one example of the data communication system of a first embodiment.

The data communication device 100 shown in FIG. 1 is connected to a network 400. The network 400 comprises a LAN (local area network), a WAN (wide area network) or the Internet.

The data communication device 100 is an apparatus that has a scanner function to read an original document and obtain image data, and is preferably a multi-function peripheral apparatus. The data communication device 100 has a function to send e-mails that include data (such as image data) obtained by reading of an original document over the network 400. More specifically, the data is converted into a prescribed file format, and is sent as an attachment to an e-mail. An e-mail sent from the data communication device 100 is forwarded via an e-mail server 300a to an e-mail server 300b. The forwarded e-mail is stored in a mailbox of the e-mail server 300b. Each computer (client) 200a, 200b and 200c receives e-mails stored in its respective mailbox.

In addition, while not shown, the data communication device 100 can also have a function to send data obtained by reading of an original document to a printer as a print job, and a function to send data obtained by reading of an original document to a facsimile device as facsimile data.

The data communication device 100 has a function to send an e-mail to multiple e-mail addresses via broadcast transmission. Broadcast transmission in this embodiment means the essentially simultaneous transmission of copies of an e-mail to multiple e-mail addresses based on the same data source.

Figure 2:
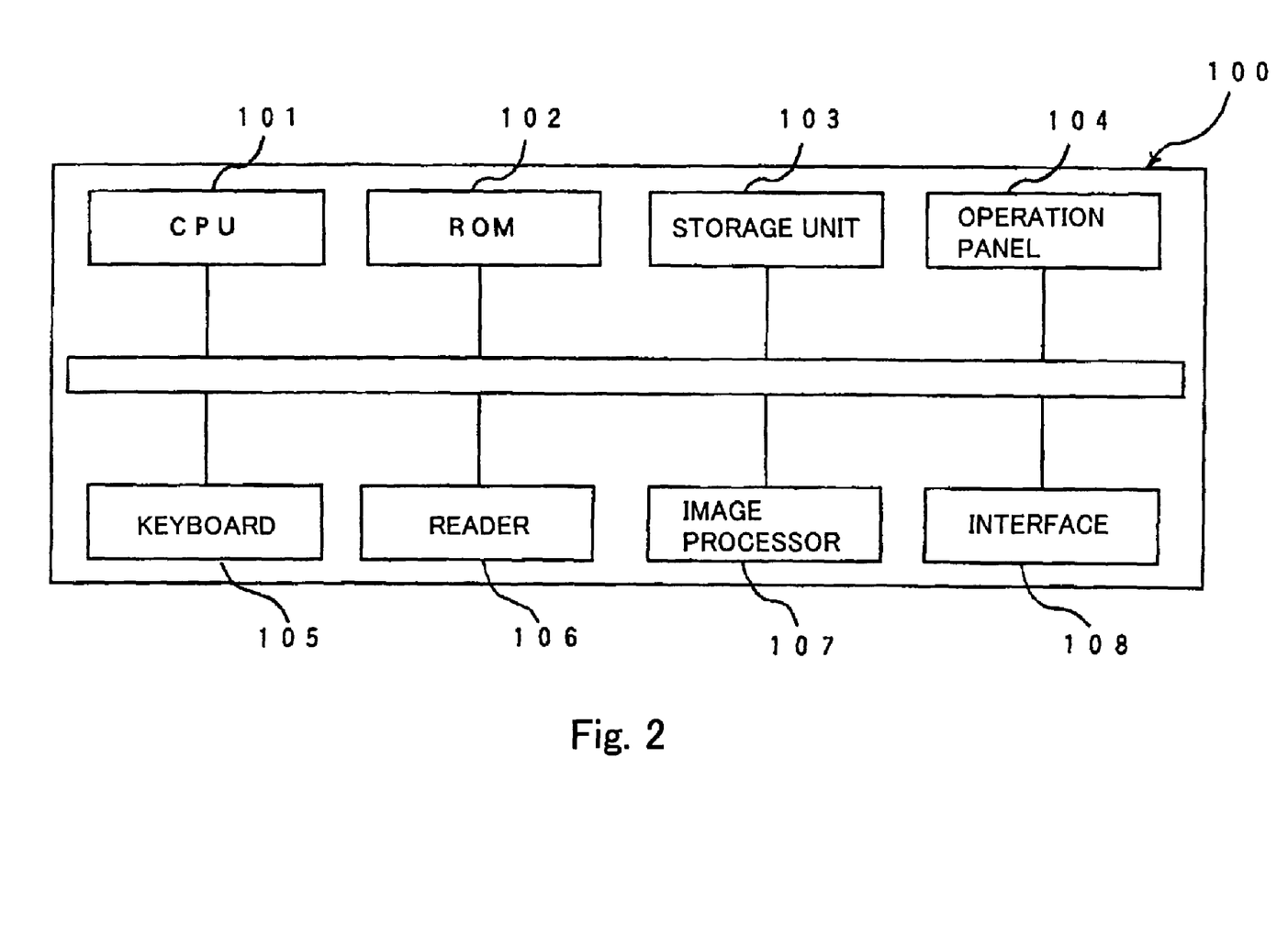
FIG. 2 is a block diagram of the data communication device shown in FIG. 1.

FIG. 2 is a block diagram showing one example of the construction of the data communication device.

The data communication device 100 has a CPU 101, a ROM 102, a storage unit 103, an operation panel 104, a keyboard 105, a reader 106, an image processor 107, and an interface 108. These components are interconnected via a bus.

The CPU 101 performs control and processing. The ROM 102 stores programs. The storage unit 103 has a RAM that temporarily stores data as a working area, and a hard disk that stores programs and data, for example. An e-mail software program, which is a program that sends, receive, stores and manages e-mails, is installed on the hard disk.

The operation panel 104 enables various types of input and performs various displays, and specifically comprises a touch panel and mechanical keys. The keyboard 105 is used to input characters and codes.

The reader 106 is a scanner engine and obtains image data by reading an original document. The image processor 107 performs various types of image processing. The image processing performed by the image processor 107 includes, specifically, a process by which image data obtained by the reader 106 is converted to data having a format that can be attached to an e-mail.

The interface 108 is an interface for communication over the network 400. Specifically, the interface 108 is an interface for communication with the computers 200a, 200b and 200c and the e-mail server 300a.

The construction of the computers 200a, 200b and 200c and the construction of the e-mail servers 300a and 300b will now be described. Because the computers 200a, 200b and 200c are identical in their construction, the computer 200a will be used in the following description as an example.

Figure 3:
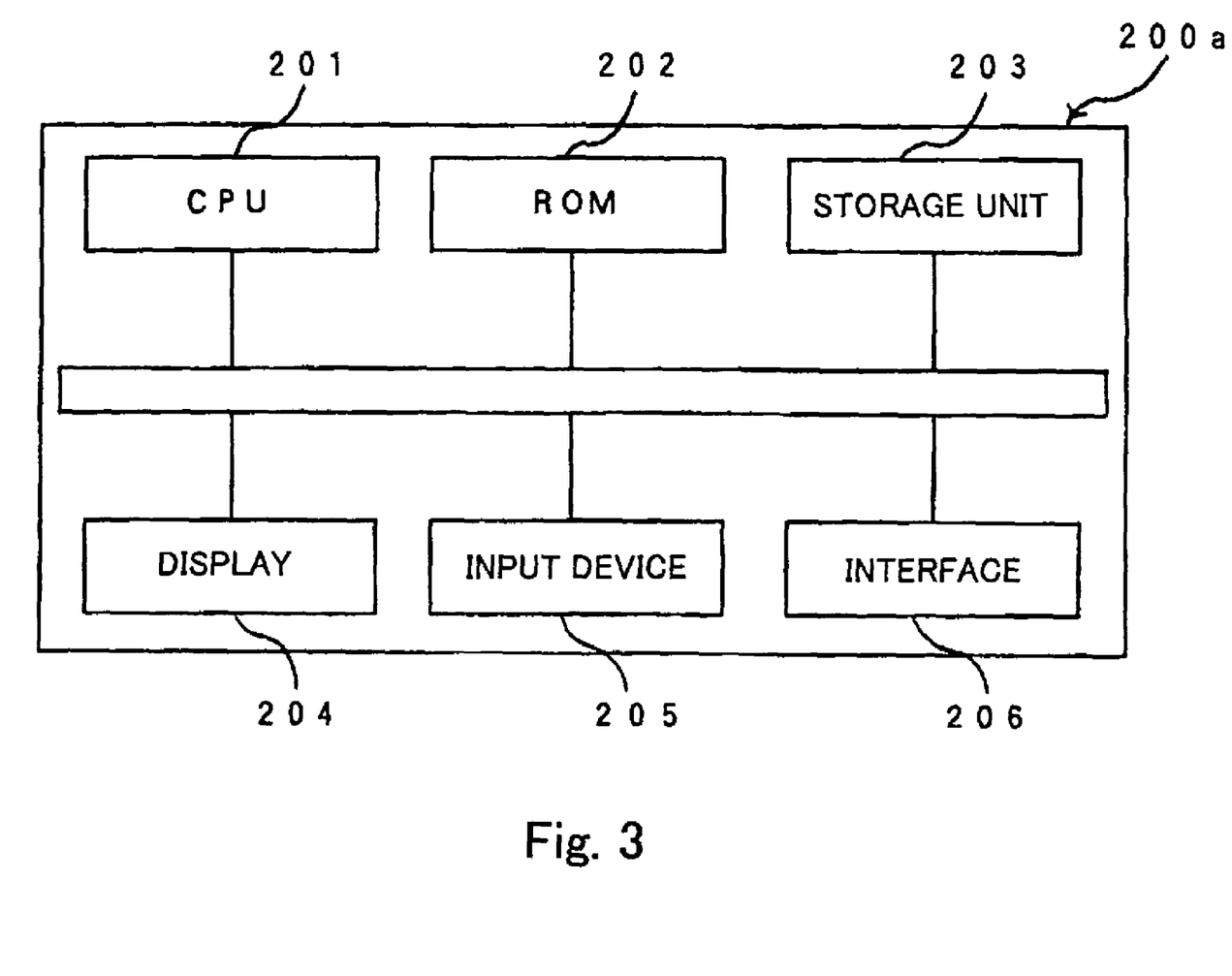
FIG. 3 is a block diagram of the computer shown in FIG. 1.

FIG. 3 is a block diagram showing one example of the computer construction. The computer 200a has a CPU 201, a ROM 202, a storage unit 203, a display 204, an input device 205, and an interface 206. The CPU 201 performs control and processing. The ROM 202 stores programs. The storage unit 203 has a RAM that temporality stores data as a working area and a hard disk that stores programs and data, for example. An e-mail software program that creates, edits, sends, receives and replies to e-mails, and stores and manages received e-mails is installed on the hard disk. The display 204 performs various display functions.

The input device 205 comprises a pointing device such as a keyboard or a mouse. The interface 206 is an interface for communication over the network 400.

The computer 200a and the e-mail servers 300a and 300b are essentially identical in their construction except for the programs installed thereon. Specifically, a software program that forwards and manages e-mails by mailbox is installed on the e-mail server 300a and 300b. In this embodiment, such protocols as SMTP (simple mail transfer protocol) and POP (post office protocol) are used for the transmission and receipt of e-mails. However, the present invention may be applied regardless of the type of the protocol used.

The data communication system described above executes the processing described below. Here, the situation in which the data communication device 100 sends e-mails to multiple e-mail addresses, i.e., where the data communication device 100 functions as a broadcast transmission sender ('From') of multiple e-mails will be explained as an example.

Figure 4:
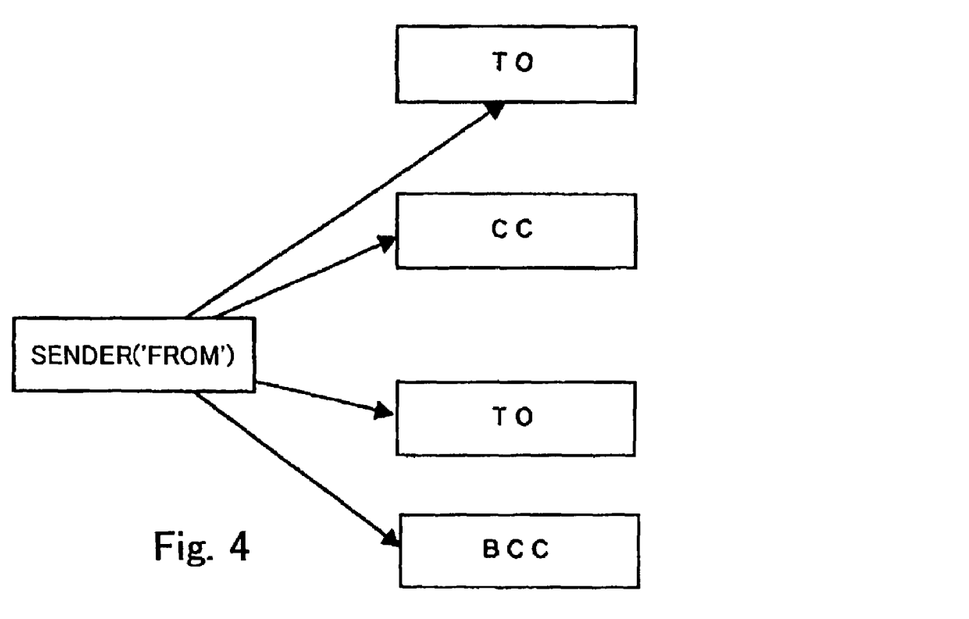
FIG. 4 is a drawing showing in a simplified fashion the routine by which an e-mail is sent via broadcast transmission.
Figure 5:
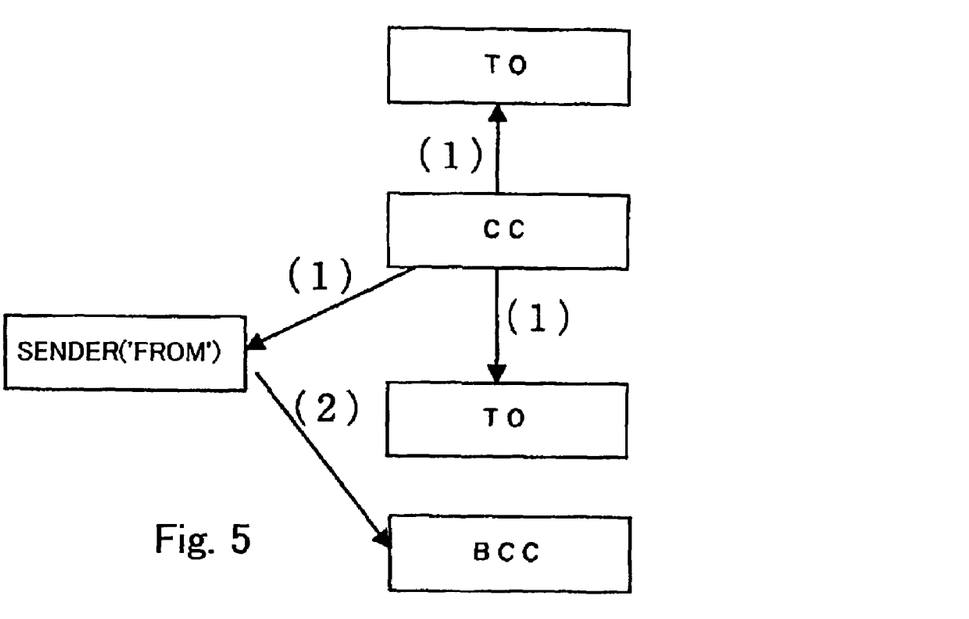
FIG. 5 is a drawing showing in a simplified fashion one example of a reply e-mail sent from one of multiple e-mail addresses to an e-mail sent via broadcast transmission.

FIGS. 4 and 5 show the basic procedure for e-mail transmission in this embodiment.

FIG. 4 shows in a simplified fashion the steps by which an e-mail is sent via broadcast transmission. The data communication device 100, which is the broadcast transmission sender ('From') for multiple copies of an e-mail, simultaneously sends such copies to multiple e-mail addresses. The multiple e-mail addresses include e-mail addresses that are entered in the prescribed areas of 'To', 'CC (carbon copy)' and 'BCC (blind carbon copy)', respectively. Here, the e-mail address entered in the 'To' area (hereinafter abbreviated as 'To') is the original (or primary) recipient. An e-mail having the same contents as that sent to the original recipient 'To' is sent to the e-mail address designated as 'CC' by entering such e-mail address in the 'CC' area (hereinafter abbreviated as 'CC') during broadcast transmission. The existence of a 'CC' is disclosed to the other e-mail addresses included in the broadcast transmission. On the other hand, an e-mail having the same contents as the e-mail sent to 'To' is sent to the e-mail address designated as 'BCC' by entering such e-mail address into the BCC area (hereinafter abbreviated as 'BCC') during broadcast transmission, as described above. However, the existence of the 'BCC' is not disclosed to other e-mail addresses in the broadcast transmission. 'BCC' is different from 'CC' in this regard. Multiple e-mail addresses may be entered in the BCC area. Therefore, more than one 'BCC' recipient may exist. Similarly, more than one 'To' or 'CC' recipient may exist as well.

FIG. 5 shows in a simplified fashion the situation in which a reply e-mail to the e-mail sent via broadcast transmission is sent from one of the multiple e-mail addresses (here, a 'CC' address is used as an example).

As shown by the arrows (1) in FIG. 5, a reply e-mail to the e-mail sent via broadcast transmission is sent from one of the multiple e-mail addresses ('CC') to which the e-mail was sent via broadcast transmission, to the recipient e-mail addresses in the broadcast transmission other than 'BCC', as well as to the e-mail address of the e-mail sender ('From'). Because the existence of the 'BCC' is not disclosed to the e-mail addresses to which the e-mail was sent via broadcast transmission, a reply e-mail is not sent to 'BCC' from any of the multiple e-mail addresses to which the e-mail was sent via broadcast transmission.

The data communication device 100, which is the sender, then receives the reply e-mail to the e-mail sent via broadcast transmission. As shown by the arrow (2) in FIG. 5, the data communication device 100 sends a copy of the reply e-mail received from one of the multiple e-mail addresses to which the e-mail was sent via broadcast transmission ('CC' here), to 'BCC', i.e., to the e-mail address that was designated as 'BCC' for the broadcast transmission. Consequently, a reply e-mail sent from one of the multiple e-mail addresses to which an e-mail was sent via broadcast transmission can be sent to all e-mail addresses including the BCC address.

Figure 6:
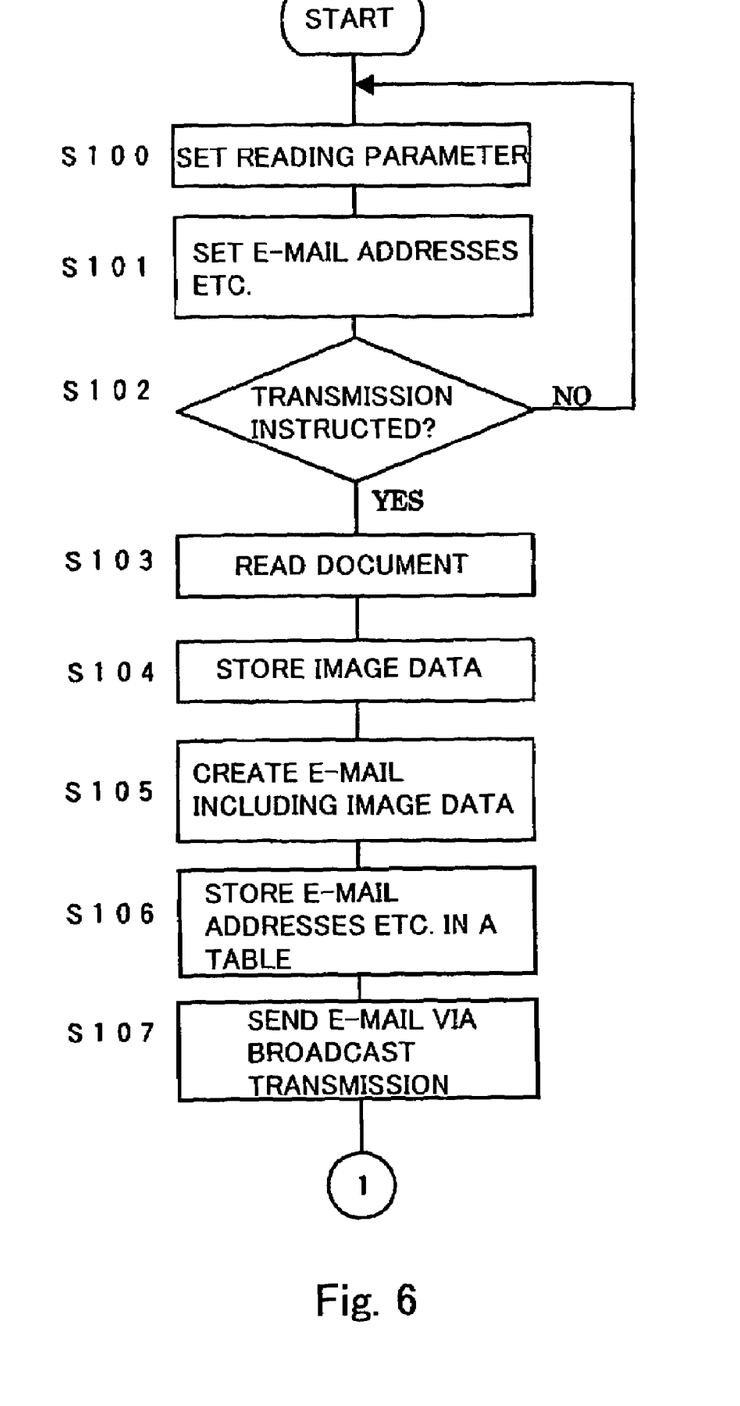
FIG. 6 is a flow chart showing a routine performed by the data communication device shown in FIG. 2.
Figure 7:
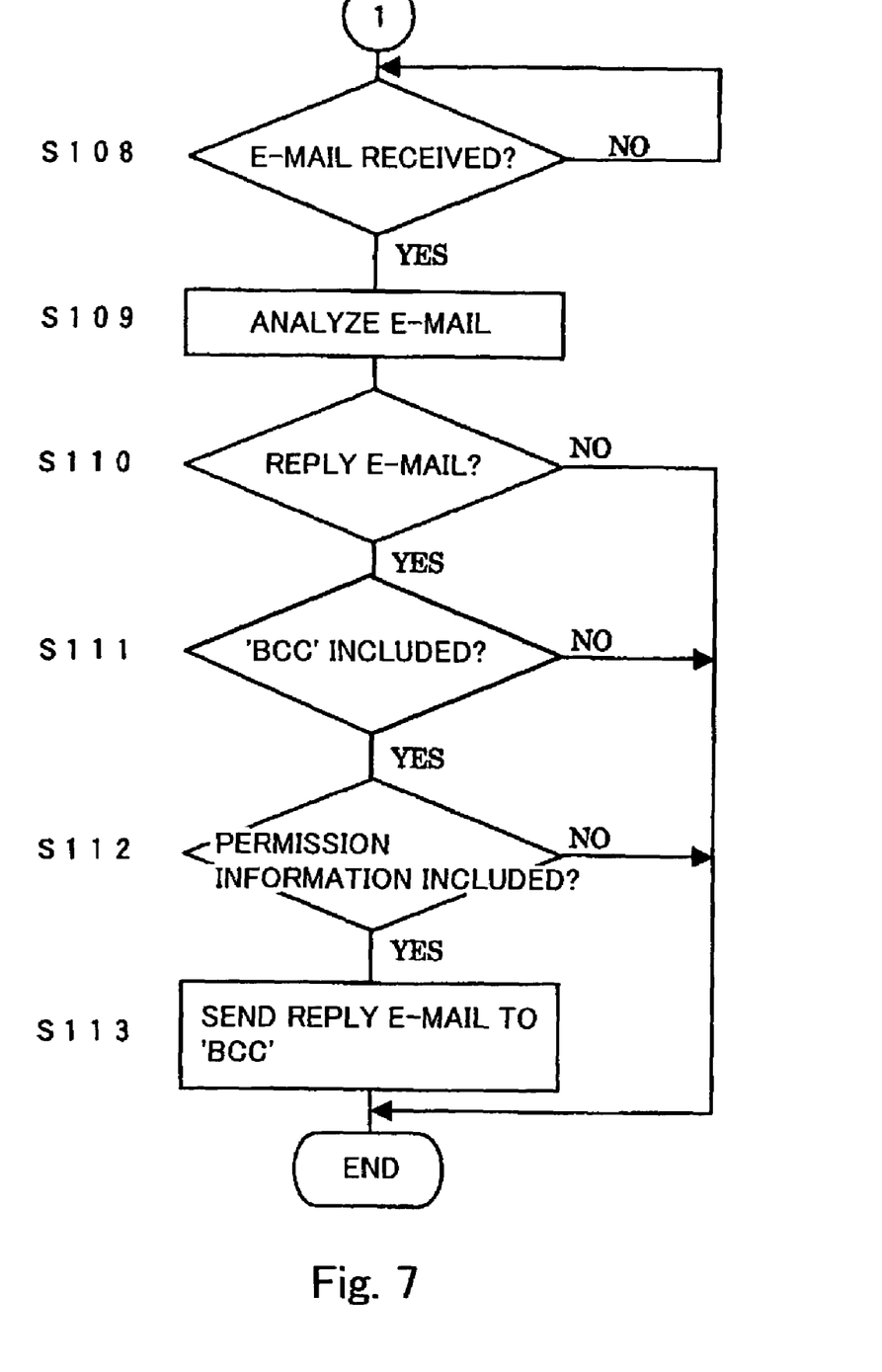
FIG. 7 is a flow chart showing the operations of the data communication device that follow after FIG. 6.

FIGS. 6 and 7 are flow charts showing the sequence of the operations performed by the data communication device 100 of this embodiment. The algorithms shown in the flow charts of FIGS. 6 and 7 are stored in the ROM 102 or the storage unit 103 as control programs, and are executed by the CPU 101.

In step S100, parameters for the reading of the original document are set. Specifically, various parameters are set, such as the file format into which the image data obtained through the reading of the original document will be converted, the file name, the image orientation (rotation), color or monochrome, density, magnification, output size, color adjustment, N-up (a process in which images for N pages are synthesized to create image data the size of a single output page), and resolution during reading. Furthermore, it is also possible to perform such settings as division, book-type original document division, double-truck original document, binding margin, erase, red-frame scan, cut range and paste range.

In step S101, the multiple e-mail addresses to which the e-mail is to be sent, the subject and the main text of the e-mail are set based on the contents input from the operation panel 104 or the keyboard 105. When transmission is instructed (YES in step S102), reading of the original document is begun (step S103).

In step S104, the image data obtained via the reading of the original document is converted into a prescribed file and stored. For example, the image data is converted into an image file having the JPEG format or PDF (portable document format) format. Where the original document comprises text, the image data obtained as a result of reading may be converted into text data by performing character recognition processing regarding the image data.

In step S105, an e-mail including the data obtained via reading of the original document is created. Specifically, an e-mail is created by adding the image file stored in step S104 as an attached file to the main text set in step S101. Where the image data obtained via reading of the original document is to be converted into text data, an e-mail that includes as the e-mail main text the data obtained as a result of reading can be created as well.

In step S106, multiple e-mail addresses to which the e-mail created in step S105 will be sent via broadcast transmission and other contingent information are stored in a table in the storage unit 103.

Figure 8:
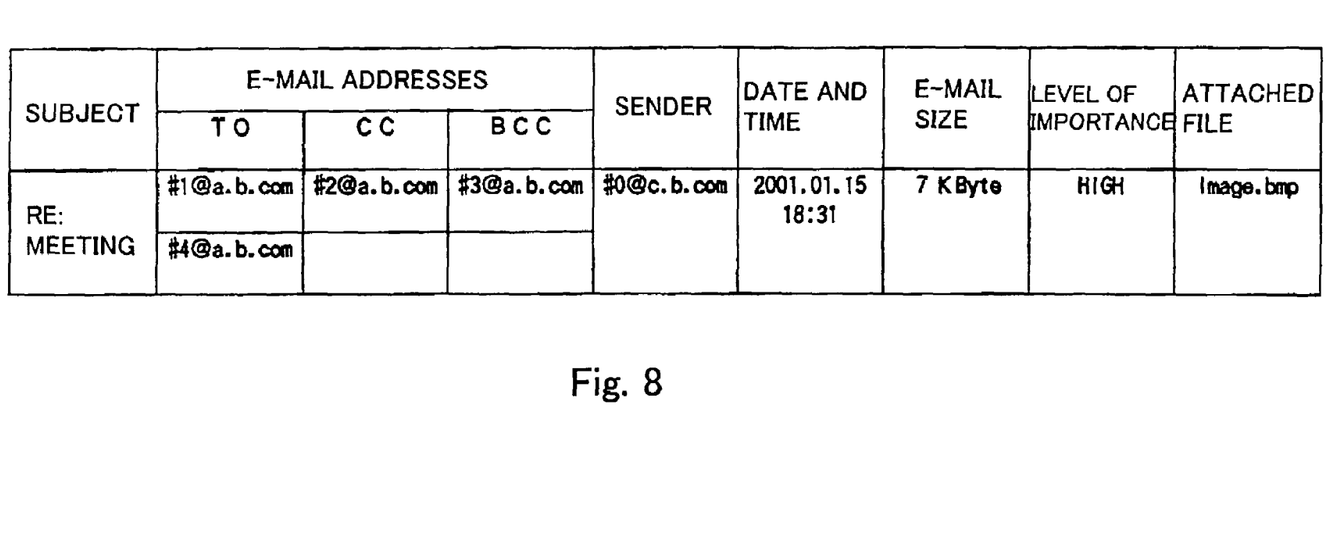
FIG. 8 is a drawing showing one example of a table in which multiple e-mail addresses are stored.

FIG. 8 shows the table inside the storage unit 103. All of the multiple e-mail addresses to which the e-mail will be sent via broadcast transmission are stored in the table. The e-mail addresses include 'To', 'CC' and/or 'BCC' as described above. The subject, the sender name, the transmission date and time, the e-mail size, the level of importance of the e-mail, the file name of the data obtained via reading of the original document (i.e., the attached file) and the location in which the file is stored (the memory address) may be stored in the table, and moreover, the date and time of receipt and the e-mail server name (the account) may also be stored in the table. A table shown in FIG. 8 is created and updated for each e-mail sent via broadcast transmission.

In step S107, the e-mail is sent via broadcast transmission to the multiple e-mail addresses set in step S101. The multiple e-mail addresses include 'To', 'CC' and/or 'BCC', as described above. The present invention proves particularly effective where 'BCC', i.e., an e-mail address designated as 'BCC' for the broadcast transmission, is included in the multiple e-mail addresses to which the e-mail is sent via broadcast transmission.

The operations of steps S108 through S113 of FIG. 7 are performed when an e-mail is received.

In step S108, it is checked at fixed intervals whether or not an e-mail has been received in the mailbox of the e-mail server 300a. It is also possible to force the e-mail server to check whether or not an e-mail has been received, based on the user's receive instruction. When an e-mail has been received (YES in step S108), the operation of the step S109 is carried out. In step S109, the e-mail is obtained and various analyses are performed.

In step S110, it is determined whether or not the received e-mail is a reply e-mail to the e-mail sent via broadcast transmission in step S107. Specifically, it is determined whether or not the e-mail received in step S108 was sent from any of the multiple e-mail addresses stored in the table inside the storage unit 103. Based on whether or not the date and time on which the processing of e-mail broadcast transmission was carried out falls before the date and time on which the e-mail was received in step S108, the subject, the attached file name, the similarity in mail size, etc., it is determined whether or not the received e-mail is a reply e-mail to the e-mail sent via broadcast transmission.

It is also possible to automatically add prescribed information to an e-mail to be sent via broadcast transmission and to determine whether or not the received e-mail is a reply e-mail to an e-mail sent via broadcast transmission based on whether or not additional information is included in the received e-mail.

Furthermore, where image data is added as an attached file to the e-mail sent via broadcast transmission and to the received e-mail, it is acceptable if the image data attached to the e-mail sent via broadcast transmission and the image data attached to the received e-mail are compared (pattern matching), and where the degree of matching between the two sets of image data equals or exceeds a prescribed value, the received e-mail is determined to be a reply e-mail to the e-mail sent via broadcast transmission.

Where the received e-mail is a reply e-mail to the e-mail sent via broadcast transmission (YES in step S110), the operation of step S111 is executed. On the other hand, where the received e-mail is not a reply e-mail to the e-mail sent via broadcast transmission (NO in step S110), the routine is ended.

In step S111, it is determined whether or not 'BCC', or an e-mail address designated as 'BCC' for the broadcast transmission, was included in the multiple e-mail addresses to which the e-mail was sent via broadcast transmission. Whether or not 'BCC' was included in the multiple e-mail addresses can be determined based on the e-mail addresses stored in the table in the storage unit 103. More specifically, the multiple e-mail addresses associated to the received reply e-mail are sought in the table, and 'BCC' is identified based on the search results. Where 'BCC' is included in the multiple e-mail addresses to which broadcast transmission was carried out (YES in step S111), the operation of step S112 is performed. On the other hand, where no 'BCC' is included in the multiple e-mail addresses to which broadcast transmission was performed (NO in step S111), the routine is ended.

In step S112, it is determined whether or not prescribed permission information is included in the reply e-mail. It is instructive information that permits transmission of the reply e-mail to 'BCC', i.e., the e-mail address designated as 'BCC' for the broadcast transmission. Where permission information is not included (NO in step S112), that means that transmission of the reply e-mail to 'BCC' is not permitted, and therefore the routine is ended. On the other hand, where permission information is included (YES in step S112), because transmission of the reply e-mail to 'BCC', i.e., the e-mail address designated as 'BCC' for the broadcast transmission is permitted, the operation of step S113 is executed accordingly. In step S113, a copy of the received reply e-mail is sent to 'BCC'.

As a result of the operations described above, a reply e-mail created by and sent from one of multiple e-mail addresses to which an e-mail was sent via broadcast transmission can be sent to 'BCC', i.e., to an e-mail address designated as 'BCC' for the broadcast transmission.

Figure 9:
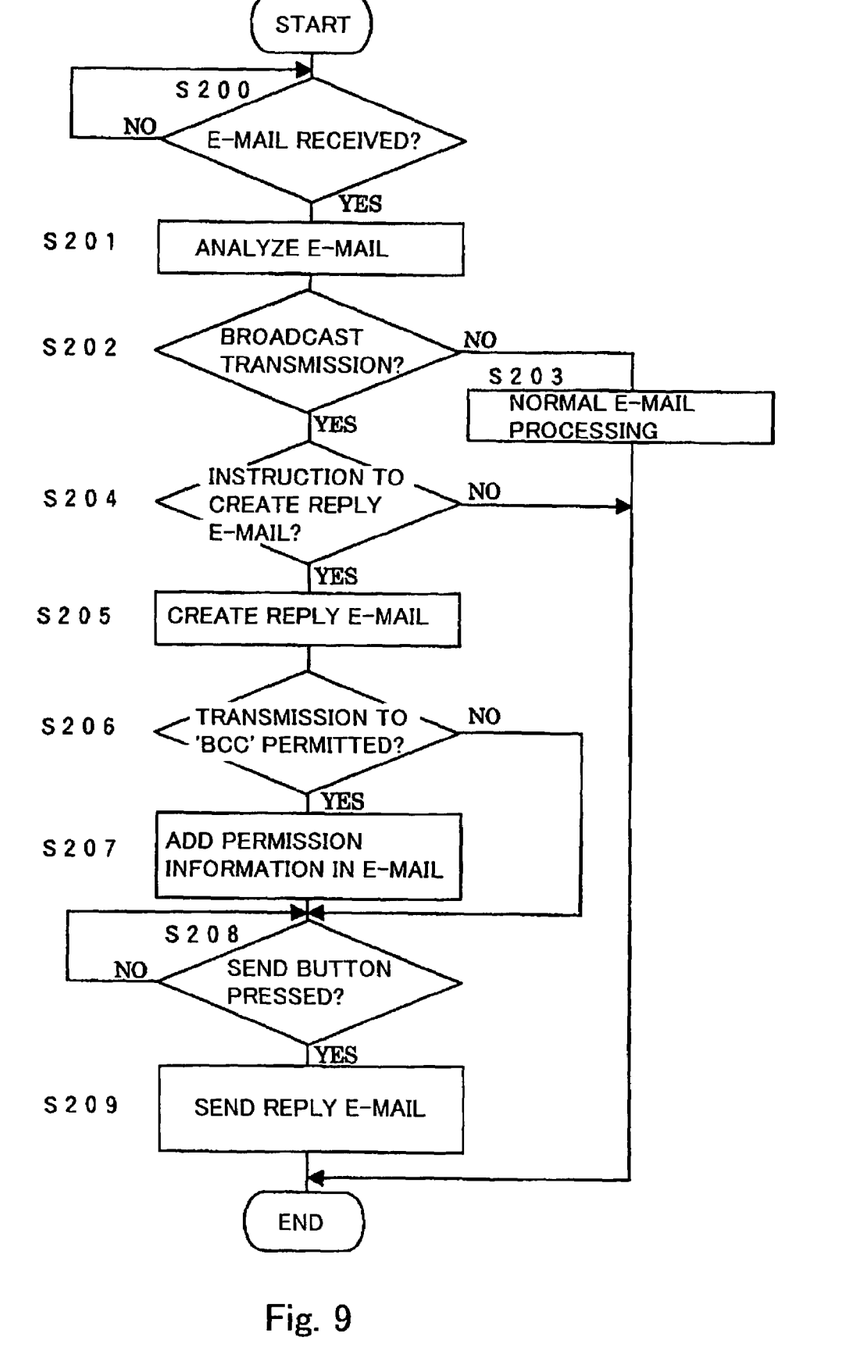
FIG. 9 is a flow chart showing a routine performed by a computer that receives an e-mail sent via broadcast transmission from an e-mail server.

FIG. 9 is a flow chart showing a routine performed by the apparatus that receives an e-mail sent via broadcast transmission from an e-mail server. Here, a description will be provided using an example in which the computer 200a receives an e-mail sent via broadcast transmission. The algorithm shown in the flow chart of FIG. 9 is stored in the ROM 202 or the storage unit 203 as a control program, and is executed by the CPU 201.

In step S200, it is checked at fixed intervals whether or not an e-mail has been received in the mailbox of the e-mail server 300b. This checking can also be done based on the user's receive instruction. Where an e-mail has been received (YES in step S200), the operation of step S201 is performed. In step S201, the e-mail is obtained and various analyses are executed.

In step S202, it is determined whether or not the received e-mail is an e-mail that was sent via broadcast transmission. Specifically, the header included in the e-mail is detected, and if multiple e-mail addresses are included in the detected header, the e-mail is determined to have been sent via broadcast transmission.

Where the received e-mail is not an e-mail sent via broadcast transmission (NO in step S202), normal e-mail processing is executed (step S203) and the routine is ended. On the other hand, where the received e-mail is an e-mail sent via broadcast transmission (YES in step S202), the operation of step S204 is carried out.

In step S204, it is determined whether or not an instruction to create a reply e-mail to the broadcast-transmitted e-mail has been issued. More specifically, it is determined whether or not the area regarding 'create reply e-mail' displayed on the display 204 was selected via the input device 205. Where it is determined as a result that reply e-mail creation was instructed (YES in step S204), a reply e-mail creation screen is displayed. On the other hand, where reply e-mail creation was not instructed (NO in step S204), the routine is ended.

In step S205, a reply e-mail is created on the reply e-mail creation screen. A reply e-mail is created via user editing of an e-mail using the keyboard and/or the mouse, for example.

In step S206, it is determined whether or not the user has instructed permission for transmission of the reply e-mail to an e-mail address designated as 'BCC' for the broadcast transmission. Where permission is instructed (YES in step S206), permission information is included in the main text of the reply e-mail, for example (step S207). On the other hand, where permission is not instructed (NO in step S206), the operation of step S207 is skipped.

When the send button is pressed (YES in step S208), the reply e-mail created in step S203 is sent to the e-mail addresses for the broadcast transmission other than 'BCC' (i.e., 'To' and 'CC') as well as to the sender e-mail address ('From') from which the broadcast transmitted e-mail was sent (step S207). In this way, the reply e-mail is not directly sent to 'BCC', i.e., an e-mail address designated as 'BCC' for the broadcast transmission, but as shown in FIG. 7, is sent thereto via the data communication device 100 ('From').

Through the operations described above, when an e-mail is sent via broadcast transmission to multiple e-mail addresses including an e-mail address designated as 'BCC', a reply e-mail from one of the multiple e-mail addresses to which the broadcast-transmitted e-mail was sent can be sent to all of the e-mail addresses including the e-mail address designated as 'BCC' for the broadcast transmission.

Figure 10:
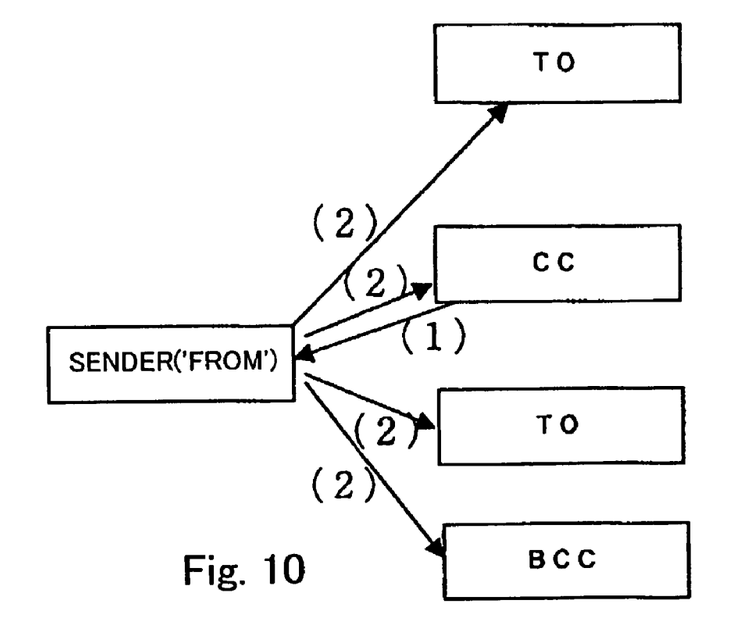
FIG. 10 is a drawing showing in a simplified fashion a first variation for the forwarding of a reply e-mail sent from one of multiple e-mail addresses to an e-mail sent via broadcast transmission.
Figure 11:
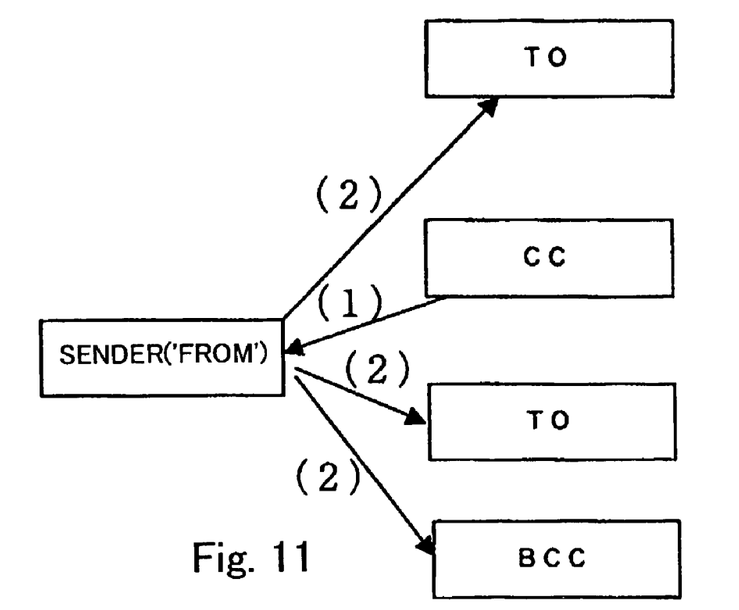
FIG. 11 is a drawing showing in a simplified fashion a second variation for the forwarding of a reply e-mail sent from one of multiple e-mail addresses to an e-mail sent via broadcast transmission.

Variations of this embodiment will now be explained. FIGS. 10 and 11 show the summary e-mail communication processing in the variation.

In both variations, an e-mail is sent via broadcast transmission to multiple e-mail addresses by the data communication device 100 before the phase shown in FIG. 10, as in the case of FIG. 4. Subsequently, as shown by the arrow (1) in FIG. 10, one of the multiple e-mail addresses to which the e-mail was sent via broadcast transmission sends a reply e-mail to the above e-mail only to the sender thereof, i.e., to the data communication device 100. As shown by the arrows (2) in FIG. 10, the data communication device 100 then sends copies of the reply e-mail to all of the multiple e-mail addresses ('To', 'CC', and 'BCC') based on the multiple e-mail addresses stored in the table in the storage unit 203.

By contrast, unlike the variation shown in FIG. 10, in the variation shown in FIG. 11, the reply e-mail is not sent to the sender thereof ('CC' in the example shown in FIG. 11), which creates and sends the reply e-mail to the sender ('From'). Because the reply e-mail is not sent to the e-mail address at which the reply e-mail was created and from which it was sent, unnecessary forwarding of the e-mail can be avoided, helping to reduce the network traffic.

Figure 12:
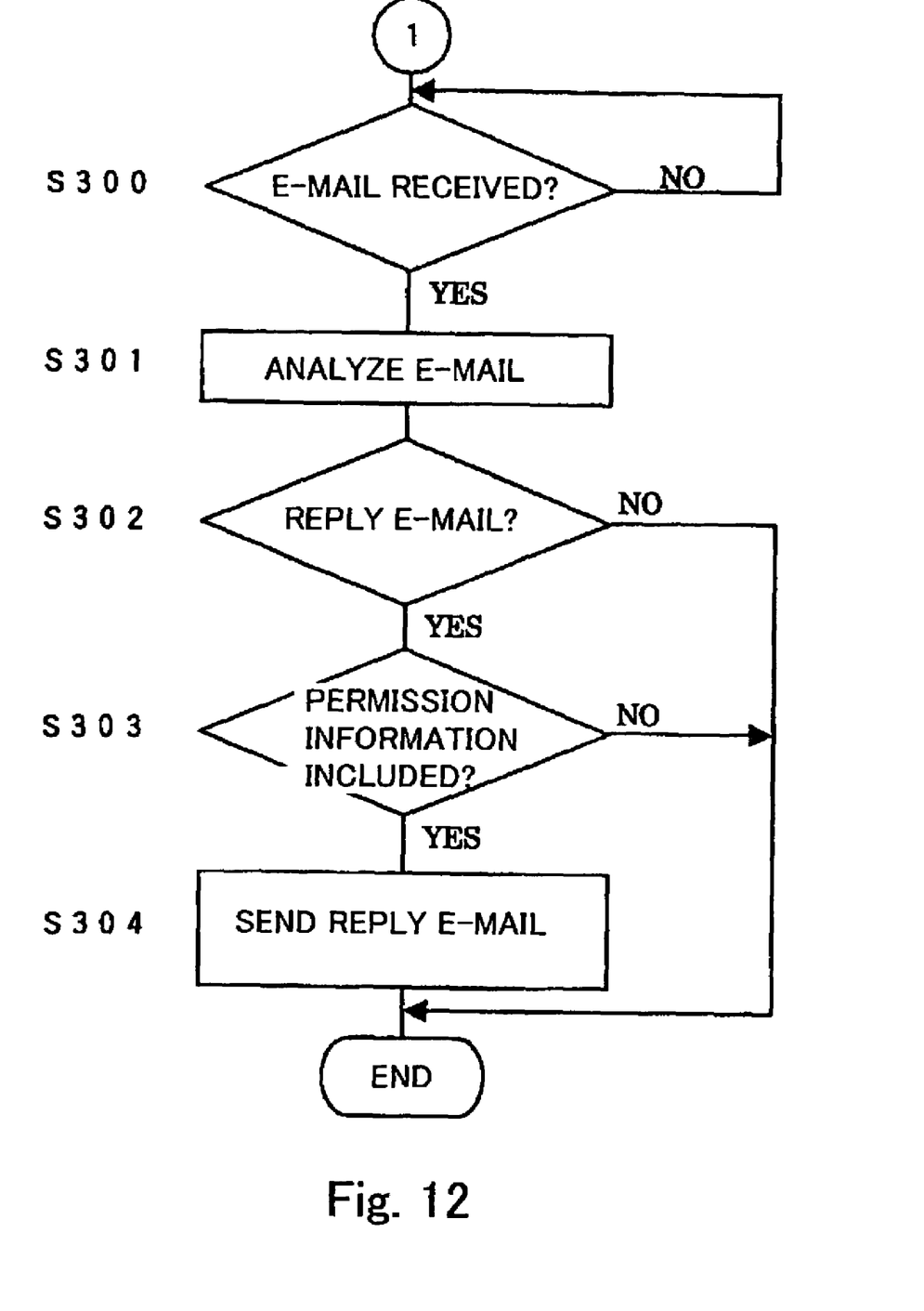
FIG. 12 is a flow chart showing a routine performed by the data communication device in the variations shown in FIG. 10 or 11.

The operations of the data communication device in the variations shown in FIGS. 10 and 11 will be described using the flow charts of FIG. 12. In these variations, the operation in which an e-mail is sent to multiple e-mail addresses via broadcast transmission is the same as in the case shown in FIG. 6. Therefore, the flow chart of FIG. 12 shows the operations after the operation in which an e-mail is sent to multiple e-mail addresses via broadcast transmission (step S107 of FIG. 6).

Because the operations in steps S300, S301, S302 and S303 are the same as steps S108, S109, S110 and S112 of FIG. 7, they will not be explained in detail.

In step S304, copies of the received reply e-mail are sent to the multiple e-mail addresses that include 'BCC', i.e., an e-mail address designated as 'BCC' for the broadcast transmission. Copies of the received reply e-mail can be sent to all of the multiple e-mail addresses to which an e-mail was sent via broadcast transmission (the case of FIG. 10) or to the e-mail addresses for the broadcast transmission other than the e-mail address from which the reply e-mail was sent (the case of FIG. 11).

Figure 13:
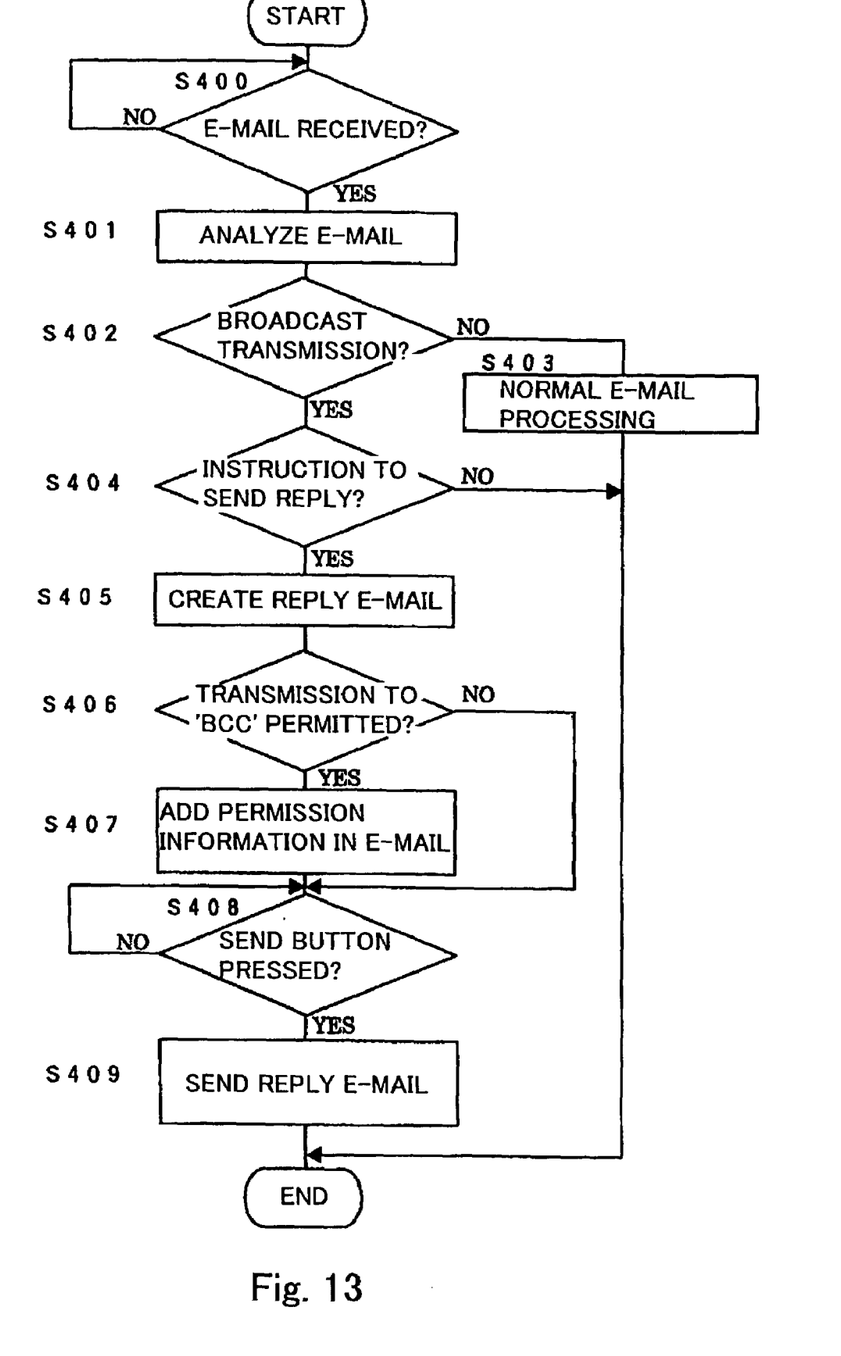
FIG. 13 is a flow chart showing a routine performed by the apparatus that receives via an e-mail server an e-mail sent via broadcast transmission in the variations shown in FIG. 10 or 11.

FIG. 13 is a flow chart showing the routine performed by the apparatus that receives a broadcast-transmitted e-mail via an e-mail server in these variations.

Because the operations of steps S400 through S408 are the same as the operations of step S200 through S208 of FIG. 9, they will not be explained in detail.

In the operation of step S409, a reply e-mail is sent only to the sender ('From') of the broadcast-transmitted e-mail.

The above descriptions were based on the situation in which the data communication device of the present invention was applied in an apparatus having a scanner function, but the data communication device of the present invention may be applied in an ordinary computer.

Figure 14:
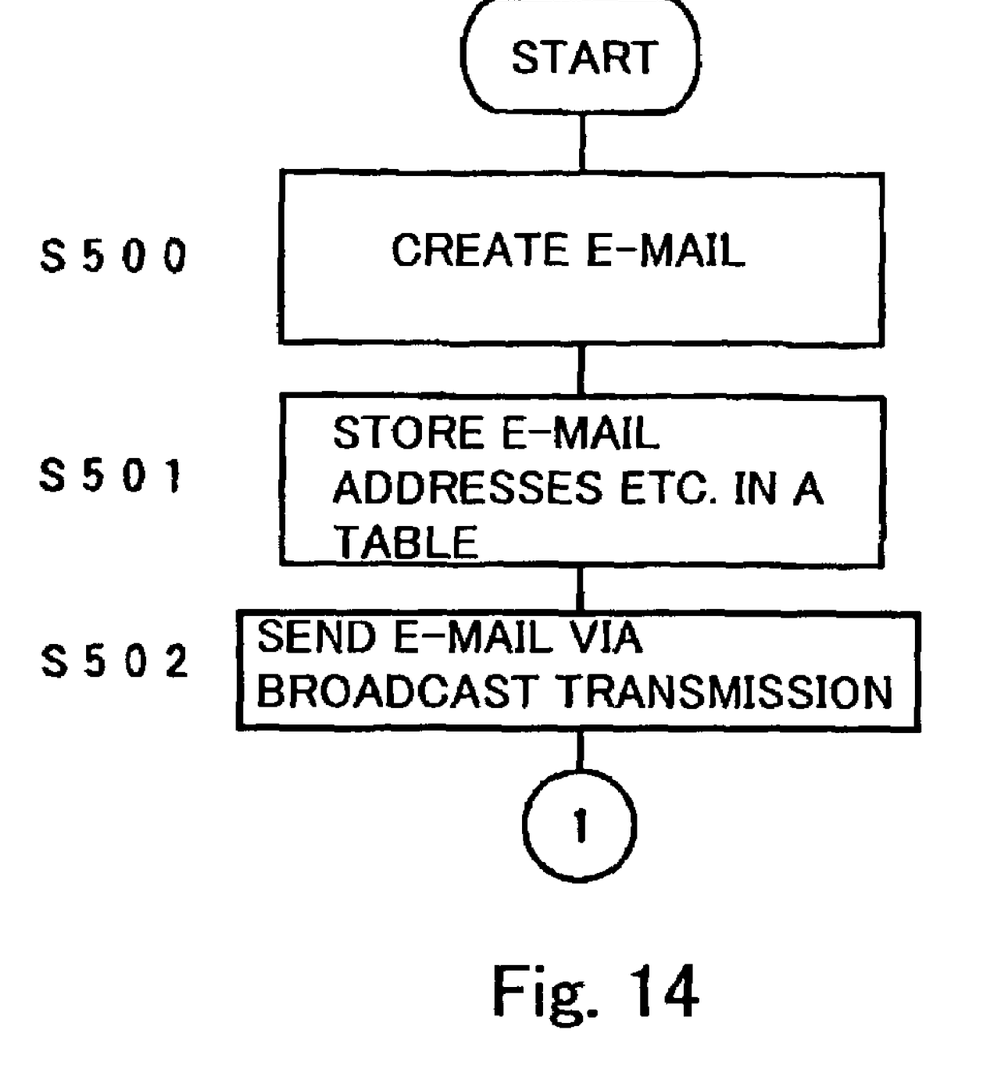
FIG. 14 is a flow chart showing the operations when the data communication device of the present invention is applied in a computer that does not have an original document reading function.

FIG. 14 is a flow chart showing the routine performed when the data communication device of the present invention is applied in a computer that does not have the function to read an original document.

Unlike the example shown in FIG. 6, in the example shown in FIG. 14, the operations involved in the reading of an original document (the operations of steps S100 through S104 in FIG. 6) are not executed.

In step S500, an e-mail is created. E-mails are created using a regular e-mail creation software program.

In step S501, the multiple e-mail addresses to which the e-mail will be sent via broadcast transmission, the subject, the transmission date and time, the size of the e-mail, etc. are stored in a table in the storage unit.

In step S503, the e-mail is sent via broadcast transmission to the multiple e-mail addresses. Because the operations thereafter are the same as those shown in FIG. 7, they will not be explained in detail. In short, a reply e-mail to the broadcast-transmitted e-mail is received from one of the multiple e-mail addresses, and a copy of the received reply e-mail is sent to the e-mail address designated as 'BCC' for the broadcast transmission based on the e-mail address stored in the table referred to above.

Consequently, a reply e-mail sent from one of the multiple e-mail addresses to which an e-mail had been sent via broadcast transmission can be sent to all of the e-mail addresses including the e-mail address designated as 'BCC' for the broadcast transmission.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, the various means that perform control of the data communication device of the present invention, as well as the data transmission method, can be implemented using a programmed computer or dedicated hardware circuits.

Where the present invention is implemented using a programmed computer, the program that causes the computer to operate may be provided on a computer-readable recording medium (such as a flexible disk or a CD-ROM), or instead of on a recording medium, it may be provided over a network. This program is normally transferred to a hard disk and stored thereon. In addition, this program may be provided as an application software program on its own, for example, or may be incorporated in the computer software as part of the computer functions.

In the above embodiments, the permission that a reply e-mail may be sent to an e-mail address designated as 'BCC' for broadcast transmission is given by the user of the receiving apparatus, and permission information is added to the reply e-mail accordingly, but it is also acceptable if such permission is designated by the user of the sending apparatus and the permission information is reflected in the reply e-mail based on this instruction. In this case, whether to send a reply to 'BCC' addresses can be decided based on the wishes of the sending user.

Furthermore, in the above embodiments, a reply e-mail is sent to 'BCC' addresses only when permission information is included in the reply e-mail, but it is also acceptable if a reply e-mail is sent to 'BCC' addresses at all times regardless of whether or not permission information is included.

According to the present invention described above, a reply e-mail to an e-mail sent via broadcast transmission can be sent to e-mail addresses designated as 'BCC' for the broadcast transmission while maintaining the confidentiality of the e-mail addresses designated as 'BCC' for the broadcast transmission.

Moreover, a reply e-mail to a broadcast-transmitted e-mail including data obtained via reading of an original document can be sent to e-mail addresses designated as 'BCC' for the broadcast transmission.

What is claimed is:

1. A data communication device comprising:
   recipient accepting means for accepting designation of one or more e-mail addresses as recipients for an e-mail for each transmission configuration, which includes 'To', 'CC' and/or 'BCC'
   sending means for sending the e-mail via broadcast transmission to multiple e-mail addresses the designation of which is accepted by the recipients accepting means;
   storing means for storing in a storage device the multiple e-mail addresses to which the e-mail was sent by the sending means via broadcast transmission;
   receiving means for receiving a reply e-mail to the e-mail sent via broadcast transmission from one of the multiple e-mail addresses that is not an e-mail address having the 'BCC' description to which the e-mail was sent via broadcast transmission by the sending means;
   address determining means for determining, after said reply e-mail is received, whether an e-mail address having a 'BCC' designation is included in the stored addresses to which the e-mail was sent via broadcast transmission from said sending means; and
   reply e-mail sending means for selectively sending a copy of the reply e-mail received by the receiving means to the e-mail address designated as 'BCC' based on the e-mail addresses stored in the storage device in accordance with the result of the determination made by said determining means.

2. A data communication device according to claim 1, further comprising a reader for reading an original document to obtain data regarding the original document, and wherein the sending means sends via broadcast transmission the data obtained by the reader together with the e-mail.

3. A data communication device according to claim 1, further comprising determining means for determining whether or not the reply e-mail received by the receiving means includes permission information that indicates that transmission of a copy of the reply e-mail to an e-mail address designated as 'BCC' is permitted, and wherein the reply e-mail sending means sends the copy of the reply e-mail to the e-mail address designated as 'BCC' only when it is determined by the determining means that the permission information is included in the reply e-mail.

4. A data communication method for use with a data communication device, comprising the steps of:
   1) accepting designation of one or more e-mail addresses as recipients for an e-mail for each transmission configuration, which includes 'To', 'CC' and/or 'BCC';
   2) sending the e-mail via broadcast transmission to multiple e-mail addresses the designation of which is accepted at step 1;
   3) storing in a storage device the multiple e-mail addresses to which the e-mail was sent via broadcast transmission at step 2;
   4) receiving a reply e-mail to the e-mail sent via broadcast transmission from one of the multiple e-mail addresses that is not an e-mail address having the 'BCC' description to which the e-mail was sent via broadcast transmission at step 2;
   5) determining, after said reply e-mail is received, whether an e-mail address having a 'BCC' description is included in the stored addresses to which the e-mail was sent via broadcast transmission at step 2; and
   6) selectively sending a copy of the reply e-mail received at the receiving step to an e-mail address designated as 'BCC' based on the e-mail addresses stored in the storage device, in accordance with the result of the determination made in step 5.

5. A data communication method according to claim 4, further comprising a step of reading an original document to obtain data regarding the original document, and wherein at step 2 the data obtained by the reader is sent via broadcast transmission together with the e-mail.

6. A data communication method according to claim 4, further comprising a step of determining whether or not the reply e-mail received at step 4 includes permission information that indicates that transmission of a copy of the reply e-mail to an e-mail address designated as 'BCC' is permitted, and wherein at step 6 the copy of the reply e-mail to the e-mail address designated as 'BCC' is sent only when it is determined that the permission information is included in the reply e-mail.

7. A computer program product stored in a computer-readable medium used for data communication processing, said computer program product including instructions to execute the following steps:
   1) accepting designation of one or more e-mail addresses as recipients for an e-mail for each transmission configuration, which includes 'To', 'CC' and/or 'BCC';
   2) sending the e-mail via broadcast transmission to multiple e-mail addresses the designation of which is accepted at step 1;
   3) storing in a storage device the multiple e-mail addresses to which the e-mail was sent via broadcast transmission at step 2;
   4) receiving a reply e-mail to the e-mail sent via broadcast transmission from one of the multiple e-mail addresses that is not an e-mail address having the 'BCC' description to which the e-mail was sent via broadcast transmission at step 2;
   5) determining, after said reply e-mail is received, whether an e-mail address having a 'BCC' description is included in the stored addresses to which the e-mail was sent via broadcast transmission at step 2; and
   6) selectively sending a copy of the reply e-mail received at the receiving step to an e-mail address designated as 'BCC' based on the e-mail addresses stored in the storage device, in accordance with the result of the determination made in step 5.

8. A computer program product stored in a computer-readable medium according to claim 7, wherein the data communication processing further comprises a step of reading an original document to obtain data regarding the original document, and wherein at step 2 the data obtained by the reader is sent via broadcast transmission together with the e-mail.

9. A computer program product stored in a computer-readable medium according to claim 7, wherein the data communication processing further comprises a step of determining whether or not the reply e-mail received at step 4 includes permission information that indicates that transmission of a copy of the reply e-mail to an e-mail address designated as 'BCC' is permitted, and wherein at step 6 the copy of the reply e-mail to the e-mail address designated as 'BCC' is sent only when it is determined that the permission information is included in the reply e-mail.

10. A computer readable recording medium that stores the program according to claim 7.

* * * * *